US012774955B2

(12) United States Patent
Ebstein et al.

(10) Patent No.: US 12,774,955 B2
(45) Date of Patent: Oct. 27, 2026

(54) METHODS AND APPARATUS FOR PERFORMING DIFFUSE OPTICAL IMAGING

(71) Applicant: VOTIS Subdermal Imaging Technologies, Ltd., Jerusalem (IL)

(72) Inventors: Steven M. Ebstein, Newton Centre, MA (US); Jacques Aschkenasy, Jerusalem (IL); Ephraim Siegel, Aspar (IL); Zeev Bomzon, Kiryat Tivon (IL); Ariel Rachminov, Jerusalem (IL)

(73) Assignee: VOTIS Subdermal Imaging Technologies, Ltd. (IL)

( * ) Notice: Subject to any disclaimer, the term of this patent is extended or adjusted under 35 U.S.C. 154(b) by 439 days.

(21) Appl. No.: 17/970,397

(22) Filed: Oct. 20, 2022

(65) Prior Publication Data

US 2023/0118120 A1 Apr. 20, 2023

Related U.S. Application Data

(60) Provisional application No. 63/257,739, filed on Oct. 20, 2021.

(51) Int. Cl.

| | |
|---|---|
| ***G01N 21/00*** | (2006.01) |
| ***G01N 21/47*** | (2006.01) |
| ***G01T 7/00*** | (2006.01) |

(52) U.S. Cl.
CPC ......... *G01N 21/4738* (2013.01); *G01T 7/005* (2013.01); *G01N 2021/4716* (2013.01)

(58) Field of Classification Search
CPC .................................................. G01N 21/4738
See application file for complete search history.

(56) References Cited

U.S. PATENT DOCUMENTS

| | | | |
|---|---|---|---|
| 5,309,908 | A | 5/1994 | Friedman et al. |
| 6,640,130 | B1 | 10/2003 | Freeman et al. |
| 6,640,132 | B1 | 10/2003 | Freeman et al. |
| 6,741,884 | B1 | 5/2004 | Freeman et al. |

(Continued)

FOREIGN PATENT DOCUMENTS

| | | |
|---|---|---|
| CN | 103347439 | 10/2013 |
| DE | 2637557 | 2/1978 |

(Continued)

OTHER PUBLICATIONS

Cugmas B. et al., Pressure-Induced Near Infrared Spectra Response as a Valuable Source of Information for Soft Tissue Classification, Journal of Biomedical Optics. vol. 18, No. 4, Apr. 2013, pp. 047002-1-047002-7.

(Continued)

*Primary Examiner* — Joseph M Santos Rodriguez
(74) *Attorney, Agent, or Firm* — Pandiscio & Pandiscio

(57) ABSTRACT

An apparatus for performing diffuse optical imaging of a patient, said apparatus comprising: a computer; at least one sensor module comprising at least one optical source, at least one photodetector, and calibration data specific to said at least one sensor module; means for communicating between said computer and said at least one sensor module; means for automatically accessing said calibration data; and means for adjusting said apparatus in order to produce calibrated measurements.

29 Claims, 8 Drawing Sheets

(56) References Cited

U.S. PATENT DOCUMENTS

| | | | |
|---|---|---|---|
| 6,810,279 | B2 | 10/2004 | Mansfield et al. |
| 6,937,885 | B1 | 8/2005 | Lewis et al. |
| 6,970,729 | B2 | 11/2005 | Hartmann |
| 7,013,172 | B2 | 3/2006 | Mansfield et al. |
| 7,463,362 | B2 | 12/2008 | Lasker et al. |
| 7,496,395 | B2 | 2/2009 | Serov et al. |
| 7,572,229 | B2 | 8/2009 | Yeo et al. |
| 7,618,376 | B2 | 11/2009 | Kimball |
| 7,628,760 | B2 | 12/2009 | Semler et al. |
| 7,728,986 | B2 | 6/2010 | Lasker et al. |
| 7,736,311 | B2 | 6/2010 | Bartnik et al. |
| 8,000,779 | B2 | 8/2011 | Bartnik et al. |
| 8,116,838 | B2 | 2/2012 | Gaspard et al. |
| 8,133,177 | B2 | 3/2012 | LaPlante et al. |
| 8,175,688 | B2 | 5/2012 | Lewis et al. |
| 8,224,425 | B2 | 7/2012 | Freeman et al. |
| 8,235,994 | B2 | 8/2012 | Hollawell |
| 8,320,996 | B2 | 11/2012 | Panasyuk et al. |
| 8,374,682 | B2 | 2/2013 | Freeman et al. |
| 8,463,366 | B2 | 6/2013 | Freeman et al. |
| 8,473,041 | B2 | 6/2013 | Bartnik et al. |
| 8,486,069 | B2 | 7/2013 | Hollawell |
| 8,538,507 | B2 | 9/2013 | Freeman et al. |
| 8,548,570 | B2 | 10/2013 | Freeman et al. |
| 8,644,911 | B1 | 2/2014 | Panasyuk et al. |
| 8,655,433 | B2 | 2/2014 | Freeman et al. |
| 8,808,291 | B2 | 8/2014 | Hollawell |
| 8,892,192 | B2 | 11/2014 | Cuccia et al. |
| 8,971,984 | B2 | 3/2015 | Freeman et al. |
| 9,000,251 | B2 | 4/2015 | Murphy et al. |
| 9,037,216 | B2 | 5/2015 | Hielscher et al. |
| 9,078,619 | B2 | 7/2015 | Panasyuk et al. |
| 9,084,533 | B2 | 7/2015 | Freeman et al. |
| 9,107,624 | B2 | 8/2015 | Darty |
| 9,204,805 | B2 | 12/2015 | Panasyuk et al. |
| 9,254,220 | B1 | 2/2016 | LaPlante et al. |
| 9,326,715 | B1 | 5/2016 | Panasyuk et al. |
| 9,345,428 | B2 | 5/2016 | Freeman et al. |
| 9,354,115 | B2 | 5/2016 | Darty |
| D758,468 | S | 6/2016 | Darty et al. |
| 9,480,424 | B2 | 11/2016 | Darty et al. |
| 9,486,142 | B2 | 11/2016 | Hielscher et al. |
| 9,492,089 | B2 | 11/2016 | Hielscher et al. |
| 9,495,516 | B2 | 11/2016 | Hielscher et al. |
| 9,526,427 | B2 | 12/2016 | Darty et al. |
| 9,619,883 | B2 | 4/2017 | Yudovsky |
| 9,648,254 | B2 | 5/2017 | Darty et al. |
| 9,655,519 | B2 | 5/2017 | Darty et al. |
| 9,746,377 | B2 | 8/2017 | Darty et al. |
| 9,766,382 | B2 | 9/2017 | Darty |
| 9,770,173 | B2 | 9/2017 | Panasyuk et al. |
| 9,772,814 | B2 | 9/2017 | Stuckman et al. |
| 9,795,303 | B2 | 10/2017 | Panasyuk et al. |
| 9,848,787 | B2 | 12/2017 | White et al. |
| 9,864,575 | B2 | 1/2018 | Stuckman et al. |
| 9,883,803 | B2 | 2/2018 | Cuccia et al. |
| 9,990,174 | B2 | 6/2018 | Stuckman et al. |
| 10,010,278 | B2 | 7/2018 | Darty et al. |
| 10,018,758 | B2 | 7/2018 | Darty |
| 10,028,676 | B2 | 7/2018 | Freeman et al. |
| 10,111,594 | B2 | 10/2018 | Hielscher et al. |
| 10,117,582 | B2 | 11/2018 | Panasyuk et al. |
| D835,698 | S | 12/2018 | Darty et al. |
| 10,178,967 | B2 | 1/2019 | Hielscher et al. |
| 10,200,655 | B2 | 2/2019 | Kim et al. |
| 10,205,892 | B2 | 2/2019 | Darty et al. |
| 10,321,869 | B2 | 6/2019 | Freeman et al. |
| 10,342,432 | B2 | 7/2019 | Cuccia et al. |
| 10,376,150 | B2 | 8/2019 | Hielscher et al. |
| 10,395,352 | B2 | 8/2019 | Barker |
| 10,448,836 | B2 | 10/2019 | Darty |
| 10,470,694 | B2 | 11/2019 | Darty et al. |
| 10,534,116 | B2 | 1/2020 | Darty |
| 10,646,109 | B1 | 5/2020 | Freeman et al. |
| 10,652,481 | B2 | 5/2020 | Darty et al. |
| 10,779,773 | B2 | 9/2020 | Freeman et al. |
| 10,798,310 | B2 | 10/2020 | Darty et al. |
| 10,813,597 | B2 | 10/2020 | Rice et al. |
| 10,900,835 | B2 | 1/2021 | Darty et al. |
| 10,921,186 | B2 | 2/2021 | Darty |
| 10,973,422 | B2 | 4/2021 | Pantelopoulos et al. |
| 11,026,582 | B2 | 6/2021 | Panasyuk et al. |
| 11,089,969 | B2 | 8/2021 | Chachisvilis et al. |
| 11,159,750 | B2 | 10/2021 | Darty et al. |
| 11,206,990 | B2 | 12/2021 | Lee et al. |
| 11,317,852 | B2 | 5/2022 | Gaspard et al. |
| 11,346,714 | B2 | 5/2022 | Darty |
| 11,399,716 | B2 | 8/2022 | Darty et al. |
| 11,439,312 | B2 | 9/2022 | Hielscher et al. |
| 2001/0034479 | A1 | 10/2001 | Ring et al. |
| 2004/0024326 | A1 | 2/2004 | Yeo et al. |
| 2005/0243322 | A1 | 11/2005 | Lasker et al. |
| 2006/0234383 | A1 | 10/2006 | Gough |
| 2009/0234206 | A1 | 9/2009 | Gaspard et al. |
| 2009/0306521 | A1 | 12/2009 | Ermakov et al. |
| 2011/0046464 | A1 | 2/2011 | Debreczeny et al. |
| 2012/0108903 | A1 | 5/2012 | Freeman et al. |
| 2012/0215112 | A1 | 8/2012 | Lewis et al. |
| 2013/0131517 | A1 | 5/2013 | Panasyuk et al. |
| 2013/0245455 | A1 | 9/2013 | Freeman et al. |
| 2013/0296666 | A1 | 11/2013 | Kumar et al. |
| 2013/0345570 | A1 | 12/2013 | Freeman et al. |
| 2014/0012135 | A1 | 1/2014 | Freeman et al. |
| 2014/0012140 | A1 | 1/2014 | Freeman et al. |
| 2014/0051946 | A1 | 2/2014 | Arne et al. |
| 2014/0058272 | A1 | 2/2014 | Naing et al. |
| 2014/0107497 | A1 | 4/2014 | Semler et al. |
| 2014/0112559 | A1 | 4/2014 | Freeman et al. |
| 2014/0206980 | A1 | 7/2014 | Lee et al. |
| 2014/0243681 | A1 | 8/2014 | Hielscher et al. |
| 2014/0316292 | A1 | 10/2014 | McRae et al. |
| 2015/0073271 | A1 | 3/2015 | Lee et al. |
| 2015/0150479 | A1 | 6/2015 | Yoshino et al. |
| 2015/0177429 | A1 | 6/2015 | Darty |
| 2015/0351635 | A1 | 12/2015 | Cerussi et al. |
| 2016/0029900 | A1 | 2/2016 | LaPlante et al. |
| 2016/0228009 | A1* | 8/2016 | Tokita .................... A61B 5/742 |
| 2016/0302674 | A1 | 10/2016 | Moyer et al. |
| 2017/0209055 | A1 | 7/2017 | Pantelopoulos et al. |
| 2018/0199829 | A1 | 7/2018 | White et al. |
| 2019/0110024 | A1 | 4/2019 | Kim et al. |
| 2019/0125195 | A1 | 5/2019 | Hielscher et al. |
| 2019/0183364 | A1 | 6/2019 | Basu |
| 2019/0239751 | A1 | 8/2019 | Hielscher et al. |
| 2019/0282134 | A1 | 9/2019 | Hielscher et al. |
| 2020/0008737 | A1 | 1/2020 | Lee et al. |
| 2021/0137446 | A1 | 5/2021 | Brownhill et al. |
| 2021/0193977 | A1 | 6/2021 | Reykhert |
| 2021/0369128 | A1 | 12/2021 | Pantelopoulos et al. |
| 2022/0039674 | A1 | 2/2022 | Chachisvilis et al. |
| 2022/0047175 | A1 | 2/2022 | Hunt et al. |
| 2022/0369941 | A1 | 11/2022 | Ferraresi et al. |

FOREIGN PATENT DOCUMENTS

| | | |
|---|---|---|
| EP | 1386578 | 2/2004 |
| EP | 2422757 | 2/2012 |
| EP | 2651309 | 10/2013 |
| EP | 2761327 | 8/2014 |
| EP | 3034054 | 6/2016 |
| EP | 3076859 | 10/2016 |
| EP | 3592219 | 1/2020 |
| JP | 6373005 | 8/2018 |
| KR | 10-1935064 | 5/2014 |
| WO | WO 2007/030379 | 3/2007 |
| WO | WO 2012/082789 | 6/2012 |
| WO | WO 2013/049629 | 4/2013 |
| WO | WO 2015/047015 | 4/2015 |
| WO | WO 2015/085240 | 6/2015 |
| WO | WO 2015/101992 | 7/2015 |
| WO | WO 2018/162728 | 9/2018 |
| WO | WO 2020/053290 | 3/2020 |

(56) References Cited

FOREIGN PATENT DOCUMENTS

| | | |
|---|---|---|
| WO | WO 2020/081896 | 4/2020 |
| WO | WO 2021/076661 | 4/2021 |

OTHER PUBLICATIONS

Ducros, M., et al., Primate Retina Imaging with Polarization-Sensitive Optical Coherence Tomography, Journal of the Optical Society of America, Dec. 2001, vol. 18, No. 12, pp. 2945-2956.

Fong, C., Development of Portable Diffuse Optical Spectroscopic Systems For Tretment Monitoring, Columbia University, 2017, pp. 1-235.

Schmitz, C. et al., Design and Implementation of Dynamic Near-Infrared Optical Tomographic Imaging Instrumentation for Simultaneous Dual-Breast Measurements, Applied Optics, Apr. 2005, vol. 44, No. 11, p. 2140-2153.

Vogt, W. et al.,Effects of Mechanical Indentation on Diffuse Reflectance Spectra, Light Transmission, and Intrinsic Optical Properties in Ex Vivo Porcine Skin, Lasers in Surgery and Medicine, vol. 44, No. 4, Mar. 2012, pp. 303-309.

* cited by examiner

METHODS AND APPARATUS FOR PERFORMING DIFFUSE OPTICAL IMAGING

REFERENCE TO PENDING PRIOR PATENT APPLICATION

This patent application claims benefit of prior U.S. Provisional Patent Application Ser. No. 63/257,739, filed Oct. 20, 2021 by VOTIS Subdermal Imaging Systems, Ltd. and Steven M. Ebstein et al. for SMART SENSORS FOR DIFFUSE OPTICAL IMAGING.

The above-identified patent application is hereby incorporated herein by reference.

FIELD OF THE INVENTION

Sensor systems for performing diffuse optical imaging typically utilize discrete optical sources and optical detectors provided in a sensor module that is connected to an interface electronics module (which may, in turn, be connected to other electronics of the sensor system, e.g., an external computer). In order to perform diffuse optical imaging using such a sensor system, it is necessary to calibrate the sensor module. The present invention comprises the provision and use of novel sensor modules having on-board calibration information stored electronically, whereby to permit calibration of the sensor module prior to its connection to the interface electronics module. The novel sensor modules are robustly modular, allowing sensor modules to be replaced by unskilled clinicians in the field, while maintaining factory calibration. The novel sensor modules also require lighter, more flexible cabling than prior art sensor modules, improving the patient experience and accuracy of the measurements.

BACKGROUND OF THE INVENTION

Diffuse optical imaging is an imaging technique for interrogating biological tissues using light in order to image tissue structure and measure concentration of tissue components, e.g., blood and its constituents. Tissue generally has a transmission window in the near infrared (NIR) spectrum and surrounding wavelengths, hereinafter referred to as "NIR". Since scattering of light dominates over absorption of light, the NIR light is diffused, and therefore computational methods must be used in order to process the measurements to produce a quantitative result.

One type of diffuse optical imaging uses discrete optical sources (sometimes referred to herein as "discrete sources" or "sources") and optical detectors, e.g., photodetectors (sometimes referred to herein as "detectors"). By way of example but not limitation, such "sources" may comprise LEDs and laser diodes, and such "detectors" may comprise silicon photodiodes. Imaging can be accomplished by transmission of interrogating (i.e., imaging) light into the tissue of a patient, i.e., with the source and detector disposed on opposite sides of the tissue to be imaged, or by reflection of the interrogating (i.e., imaging) light, i.e., with the source and detector disposed on the same side of the tissue. With modern electronics, it is possible to design systems that enable robust detection of the scattered NIR light over multiple centimeter (cm) long transmission paths. This correlates to measurements corresponding to several centimeter (cm) depths within the tissue being imaged, utilizing inexpensive sources and detectors.

An exemplary light-based imaging system is described by Hielscher et al. in U.S. patent application Ser. No. 16/093,775 for MONITORING TREATMENT OF PERIPHERAL ARTERY DISEASE (PAD) USING DIFFUSE OPTICAL IMAGING, which issued as U.S. Patent No. 11,439,312 (sometimes hereinafter referred to as the "Hielscher '312 patent"), and which patent is hereby incorporated herein by reference in its entirety. Another exemplary light-based imaging system is described by Hielscher et al. in U.S. Pat. No. 10,111,594 for COMPACT OPTICAL IMAGING DEVICES, SYSTEMS, AND METHODS (hereinafter referred to as the "Hielscher '594 patent"), which patent is hereby incorporated herein by reference in its entirety. Both exemplary systems (i.e., the system of the Hielscher '312 patent and the system of the Hielscher '594 patent) describe systems designed to measure the concentrations of, and the changes in concentration of, various tissue components, principally oxy-hemoglobin ($HbO_2$), deoxy-hemoglobin (Hb), and total hemoglobin ($Hb_{tot}$).

The light-based imaging system 2 described in the Hielscher '312 patent, shown schematically in FIG. 1, generally comprises a plurality of sensor modules 5 each housing a plurality of NIR sources 10 and detectors 15. Sensor modules 5 (sometimes hereinafter referred to as "sensor patches" or "patches"), are each connected by a multi-conductor cable 20 to interface electronics module 25 which drive NIR sources 10 and measure the signals produced by detectors 15 (e.g., photodetectors). Interface electronics module 25 may be connected to a computer 30 configured to process and store data received from interface electronics module 25, and/or to provide instructions to interface electronics module 25 for driving NIR sources 10 and/or detectors 15.

An exemplary sensor module 5 for use in a diffuse optical imaging system is shown in FIGS. 2 and 3. Sensor module 5 generally comprise a plurality of NIR sources 10 (e.g., laser diodes, or "LDs") and a plurality of detectors 15 (e.g., silicon photodiodes, or "PDs"). The Hielscher '312 patent describes using a fifteen conductor multi-conductor cable 20 for effecting connection of interface electronics module 25 to each sensor module 5 comprising four sources and two detectors, whereby to permit the transmitting of various analog signals therebetween. With the system of the Hielscher '312 patent, multi-conductor cable 20 comprises eight conductors for the four NIR sources 10 (i.e., LDs), four conductors for the detectors 15 (i.e., PDs), and three conductors for shielding. In fact, where NIR sources 10 comprise LDs, such NIR sources typically comprise three leads for each NIR source for conducting signals relating to drive current, return, and a monitor photodiode to control the power output. In addition, it is possible to use small coaxial cables for each detector 15 in order to reduce shielding requirements. Thus, an alternative multi-conductor cable 20 for use with the system of the Hielscher '312 patent could have four leads for the NIR sources 10, times three, plus four leads for the detectors 15 resulting in 16 leads/conductors, and possibly including one more conductor in order to shield the entire cable (i.e., 17 conductors in total).

In order to produce stable and repeatable measurements, NIR sources 10 and detectors 15 must be fixed in close proximity to the patient's skin (i.e., against the surface of the skin) where the measurement is to be made. In particular, detectors 15 should be in optical contact with the skin of the patient, since an air gap increases the refractive index discontinuity, thereby reducing the efficiency of the optical coupling to the detector. Any change in the position of detector 15 during use, e.g., if the detector 15 is in optical contact with the skin of the patient, or there is an air gap between detector 15 and the patient's skin, may cause a change in the measured signal. Since the optical output of NIR sources 10 is restricted in angle, and since all "small package" laser diodes (LDs) (i.e., NIR sources 10) have an air gap, the light output is less sensitive to changes in the position of NIR sources 10 than changes in the position of detectors 15, though such changes can still affect the measured signal.

The number of conductors disposed in multi-conductor cable 20 results in consequences for the usability of the system. The weight and stiffness of multi-conductor cable 20 depends on the number of conductors (i.e., leads) contained within the cable, the size (i.e., gauge) of the conductors, the insulation material and thickness thereof (including, if desired, the presence of shielding), and the jacket material of the outer covering of multi-conductor cable 20 (and the thickness of the same).

For a system such as is described in the Hielscher '312 patent configured with typical choices for the components that are used in the exemplary embodiment discussed above, the resulting multi-conductor cable 20 is typically both heavy and stiff. Specifically, the multi-conductor cable 20 is sufficiently heavy (and stiff) that it is challenging to comfortably secure sensor module 5 to the skin of the patient.

It will also be appreciated that due to the heavy (and stiff) nature of multi-conductor cable 20, relatively small movements of the patient's body can stress the cable sufficiently that, due to its stiffness, the cable tends to resist the movement of the patient and instead tends to effect movement of sensor module 5 relative to the patient's skin.

In addition to the forgoing, it will be appreciated that several aspects of light-based imaging system 2 of the Hielscher '312 patent must be calibrated before system 2 may be used. More particularly, due to the variation inherent in individual elements of NIR sources 10 (e.g., the LDs) and/or individual elements of detectors 15 (e.g., the PDs), as well as any mechanical variations between different sensor modules 5, the internal electronics of each sensor module 5 must be adjusted (i.e., calibrated) for that particular sensor module 5. Specifically, the drive current delivered to each individual element (e.g., LD) of NIR sources 10 must be set so each element (e.g., an LD) puts out a known power, whereby to maximize the signal-to-noise ratio (SNR) of the signals while maintaining the laser power within safety limits. The wavelength of light emitted by each element of NIR sources 10 (e.g., each LD) varies within several nm, and the wavelength must be accurately measured in order to derive certain desired quantities via computation. By way of example but not limitation, the NIR absorption spectra of Hb and $HbO_2$ are generally decreasing and increasing, respectively, from 700 nm to 900 nm, crossing at the isobestic point around 808 nm. Using at least two LDs as NIR sources 10, with the at least two LDs emitting light having wavelengths that are sufficiently separated (ideally on either side of the isobestic point), enables the absolute or relative concentrations of Hb and $HbO_2$ to be estimated. Common grades of LDs used as NIR sources 10 typically emit light with wavelengths falling within a ±10 nm range. Since absorption spectra can vary significantly over this wavelength range, accurate concentration measurement requires that the actual wavelengths of the light emitted by NIR sources 10 (i.e., the LDs) must be calibrated.

For a given optical output (e.g., laser power) of NIR sources 10, detector 15 (e.g., PD) outputs must also be calibrated in order for the computational algorithm that is applied to return an accurate concentration measurement for the various tissue components. This is because, with a light-based imaging system such as light-based imaging system 2 of the Hielscher '312 patent, the amount of light emitted by NIR sources 10 (i.e., the LDs) and detected by detectors 15 (i.e., the PDs) is what is measured, which measurement can then be used to accurately derive concentrations via an appropriate algorithm. Thus, the settings and measured parameters of NIR sources 10 and detectors 15, as well as other detailed settings of the electronics, represent the calibration that is required for processing the measured signals numerically to produce useful diagnostics. In particular, it will be appreciated that if the wavelengths of light emitted by NIR sources 10, the output power of NIR sources 10, and the responsiveness of detectors 15 are well-calibrated (e.g., using a tissue phantom), it is possible to accurately derive concentrations of tissue components such as Hb and $HbO_2$ in a patient.

The Hielscher '594 patent discloses using potentiometers or variable resistors within the interface electronics module 25 in order to adjust the drive current to NIR sources 10, and hence their output power. This highlights the need to set the drive current of interface electronics module 25 for each particular NIR source 10 of sensor module 5. Similarly, the sensitivity of each detector 15, as well as the gain of the electronic circuitry which processes signals relayed from each detector 15, must be known for the particular sensor module 5 that is to be used, as well as for the particular interface electronics module 25 that is to be used, in order to obtain consistent, calibrated results from different systems.

It is well known that cables and connectors are a frequent failure point for electronic devices in general, and specifically for electronic devices used in contexts where a high degree of precision is necessary in order to derive accurate results (such as the light-based imaging system 2 of the Hielscher '312 patent discussed above). Furthermore, with diagnostic equipment such as light-based imaging system 2, clinicians/patients must handle sensor modules 5 when sensor modules 5 are applied to each patient, creating the chance for mishandling (e.g., dropping sensor module 5, banging sensor module 5 against an object, etc.), thereby further contributing to some frequency of failures. When such failures occur, the failed components, i.e., sensor module 5 and/or its multi-conductor cable 20, must be replaced and system 2 must be re-calibrated, i.e., the sensor electronics must be adjusted to correspond to the parameters of the new component (e.g., sensor module 5, multi-conductor cable 20, etc.).

Ideally, calibration should be quick and easy to perform, preferably through an automated process that does not require a skilled operator.

The systems described in the Hielscher '312 patent and the Hielscher '594 patent have been shown to be an effective means of providing information that helps a physician diagnose and treat peripheral artery disease (PAD), a condition common in a large fraction of diabetics, of whom there are hundreds of millions worldwide. Such a system is thus of great interest for screening and monitoring patients for PAD in order to manage PAD more effectively, whereby to improve patient health and avoid complications resulting from unmonitored/untreated PAD (e.g., amputation).

However, existing light-based imaging systems such as those disclosed by the Hielscher '312 and Hielscher '594 patents, are not designed for commercial deployment, i.e., deployment in which relatively unskilled medical technicians are employed to operate the light-based imaging system, particularly if system components (e.g., sensor module 5, multi-conductor cable 20, etc.) need to be replaced and re-calibrated.

Thus there exists a need for improved light-based imaging systems that facilitate quick and easy calibration of the electronics of the system so as to permit relatively unskilled clinicians to replace elements of the system as needed without compromising accuracy, and which address the issues inherent with the use of heavy, bulky, stiff cabling.

SUMMARY OF THE INVENTION

The present invention comprises the provision and use of new and improved sensor modules and cabling for use in diffuse optical imaging (DOI) systems. The present invention comprises novel sensor modules and associated electronics that can be quickly and easily exchanged with existing sensor modules and associated electronics of the diffuse optical imaging system, and calibrated quickly and automatically by relatively unskilled clinicians. The present invention also comprises the provision and use of novel sensor modules and cabling that reduces the number of conductors used in the associated cabling for a given number of sensor modules, reducing the size and weight of the cabling and making it easier to secure the sensor module(s) to the patient's skin, thereby improving the patient experience and increasing the likelihood that reliable measurements are produced.

In one form of the invention, there is provided an apparatus for performing diffuse optical imaging of a patient, said apparatus comprising:

- a computer;
- at least one sensor module comprising at least one optical source, at least one photodetector, and calibration data specific to said at least one sensor module;
- means for communicating between said computer and said at least one sensor module;
- means for automatically accessing said calibration data; and
- means for adjusting said apparatus in order to produce calibrated measurements.

In another form of the invention, there is provided a method for calibrating apparatus used in performing diffuse optical imaging of a patient, said method comprising:

- providing apparatus comprising:
  - a computer; and
  - a sensor module comprising:
    - at least one light source;
    - at least one light detector; and
    - calibration data specific to said sensor module;
- accessing said calibration data from said sensor module; and
- using said calibration data to adjust said apparatus.

In another form of the invention, there is provided apparatus for performing diffuse optical imaging of a patient, said apparatus comprising:

- a sensor module comprising:
  - at least one light source;
  - at least one light detector; and
  - a unique label disposed on an exterior surface of said sensor module, wherein said unique label comprises calibration data corresponding to said sensor module.

BRIEF DESCRIPTION OF THE DRAWINGS

These and other objects and features of the present invention will be more fully disclosed or rendered obvious by the following detailed description of the preferred embodiments of the invention, which is to be considered together with the accompanying drawings wherein like numbers refer to like parts, and further wherein.

DETAILED DESCRIPTION OF THE PREFERRED EMBODIMENTS

The present invention comprises the provision and use of new and improved sensor modules and cabling for use in diffuse optical imaging (DOI) systems. The present invention comprises novel sensor modules and associated electronics that can be quickly and easily exchanged with existing sensor modules and associated electronics of the diffuse optical imaging system, and calibrated quickly and automatically by relatively unskilled clinicians. The present invention also comprises the provision and use of novel sensor modules and cabling that reduces the number of conductors used in the associated cabling for a given number of sensor modules, reducing the size and weight of the cabling and making it easier to secure the sensor module(s) to the patient's skin, thereby improving the patient experience and increasing the likelihood that reliable measurements are produced.

Diffuse optical imaging (DOI) is one technique for measuring the concentration of tissue components, e.g., the concentration of oxy- and deoxy-hemoglobin of blood within the human body. DOI can immediately be used to assess oxygen saturation in the tissue. In addition, when coupled with a means of dynamically altering blood flow (e.g., using a pressure cuff to introduce vascular and/or arterial occlusion), the dynamic response of the concentration of oxyhemoglobin and deoxyhemoglobin provides useful diagnostic information for assessing a patient's blood circulation.

As discussed above in the context of the systems disclosed in the Hielscher '312 and Hielscher '594 patents, one technique for DOI uses sensor modules secured to the skin of a patient which contain discrete optical sources (e.g., light emitting diodes (LEDs), laser diodes (LDs), etc.) and discrete optical detectors (e.g., photodiodes (PDs)). In some scenarios it is advantageous to secure a plurality of sensor modules to the patient's skin at different locations, with each sensor module containing a plurality of optical sources and detectors.

Figure 4:
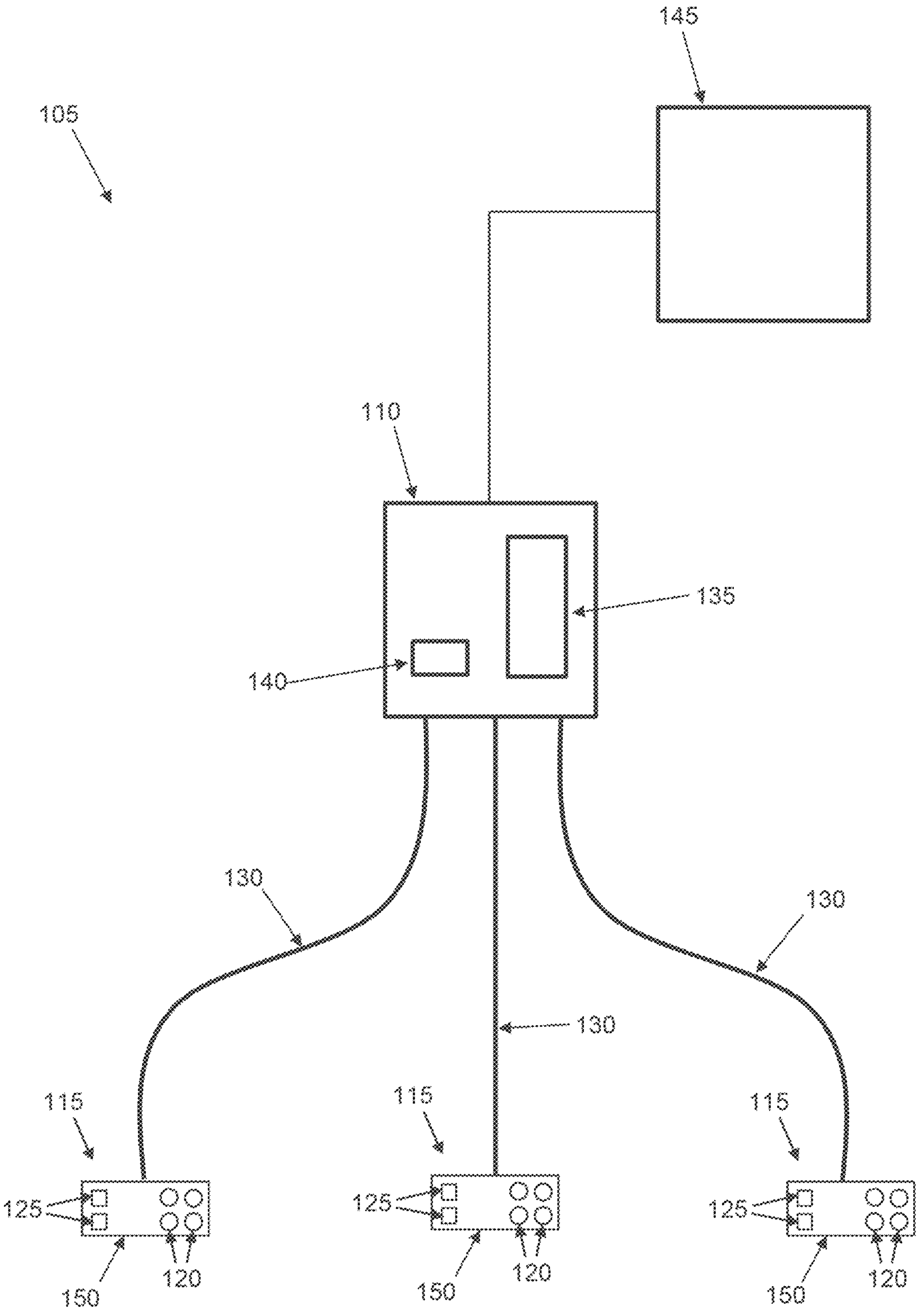
FIG. 4 is a schematic view showing a novel system for performing diffuse optical imaging (DOI) formed in accordance with the present invention.

More particularly, and looking now at FIG. 4, there is shown a diffuse optical imaging system 105 formed in accordance with the present invention. System 105 generally comprises a centralized interface electronics unit module 110 having a plurality of sensor modules 115 electrically connected thereto. Each of the plurality of sensor modules 115 comprises a plurality of optical sources 120 for generating an optical signal (e.g., NIR light), and a plurality of detectors 125 (e.g., photodetectors) for detecting light generated by optical sources 120 after the light has passed through the tissue to which sensor module 115 is attached. Each of the plurality of sensor modules 115 is electrically connected to interface electronics module 110 via a multi-conductor cable 130 configured to carry signals that drive optical sources 120 and relay the corresponding signals from detectors 125 back to interface electronics module 110.

In one preferred form of the invention, interface electronics module 110 comprises analog and/or digital circuitry for controlling and performing the measurements, and interface electronics module 110 comprises one or more microcontroller units (MCUs) 135 connected to various peripheral integrated circuits (ICs) 140 that manage operation of optical sources 120, detectors 125, and digitization of the measured signals received from detectors 125. Alternatively and/or additionally, if desired, an external computer 145 may be connected to interface electronics module 110 in order to provide the foregoing functionality (and/or such functionality as will be apparent to one of skill in the art in view of the present disclosure). Computer 145 is preferably configured to control optical imaging system 105 and comprises an appropriate user interface to assist the clinician in doing so. Computer 145 preferably comprises non-volatile memory (e.g., a disk drive) for storing the measurement and other data obtained by optical imaging system 105.

In a preferred form of the invention, interface electronics module 110 and sensor module(s) 115 each comprise at least one printed circuit board (PCB) (not shown). The sensor module PCB comprises the aforementioned optical sources 120 (e.g., optoelectronic sources) and detectors 125 (e.g., photodetectors) as well as appropriate connectors soldered to its PCB, and is contained within a housing 150 constructed of an appropriate material (e.g., a polymer). The interface electronics module typically has a wide variety of electronic components mounted on its PCB(s), as will be apparent to one of skill in the art in view of the present disclosure. If desired, computer 145 and interface electronics module 110 may comprise a single assembly on a single PCB.

The systems described in the Hielscher '312 patent and the Hielscher '594 patent include analog-to-digital converters (ADCs) external to a microcontroller unit (MCU), laser diode driver integrated circuits (ICs), controllable oscillators, analog filters, multiplexers and demultiplexers, as well as discrete logic ICs to connect the various elements of the system, which are controlled by the MCU of the interface electronics module. The MCU is preferably connected to an external computer (e.g., a desktop computer, laptop, tablet, smartphone, etc. which runs the system). This computer manages the user interface (UI) for interacting with the system, controls the interface electronics module through its MCU, receives data from the interface electronics module, and processes the data for display and storage.

As discussed above, system 2 of the Hielscher '312 patent requires a multi-conductor cable 20 comprising approximately fifteen conductors in order to transmit the analog signals between sensor module 5 and interface electronics module 25, i.e., to send drive signals to NIR sources 10 and receive outputs from detectors 15, both from detectors 15 located on sensor module 5 and from the detectors (e.g., 1 per NIR source 10) that are included in NIR sources 10. System 2 of the Hielscher '312 patent also requires that the associated interface electronics module 25 be adjusted, using manual trimpots, in order to calibrate the output of each NIR source 10.

Prior art diffuse optical imaging (DOI) systems suffer from some limitations due to the way that the sensor modules have been implemented. Typically, with prior art systems, the sensor modules (e.g., sensor module 5) comprise one or more light sources (e.g., NIR sources 10) and one or more detectors (e.g., detectors 15) with cables (e.g., multi-conductor cable 20) that connect circuitry (e.g., interface electronics module 25) directly to the light sources and detectors. As discussed above, this configuration generally requires multi-conductor cables comprising many of conductors, going to multiple terminals of multiple components. As also discussed above, such prior art systems also require that all calibration is done through a manual process since prior art systems lack any means of storing or retrieving calibration information for each sensor module.

Figure 5:
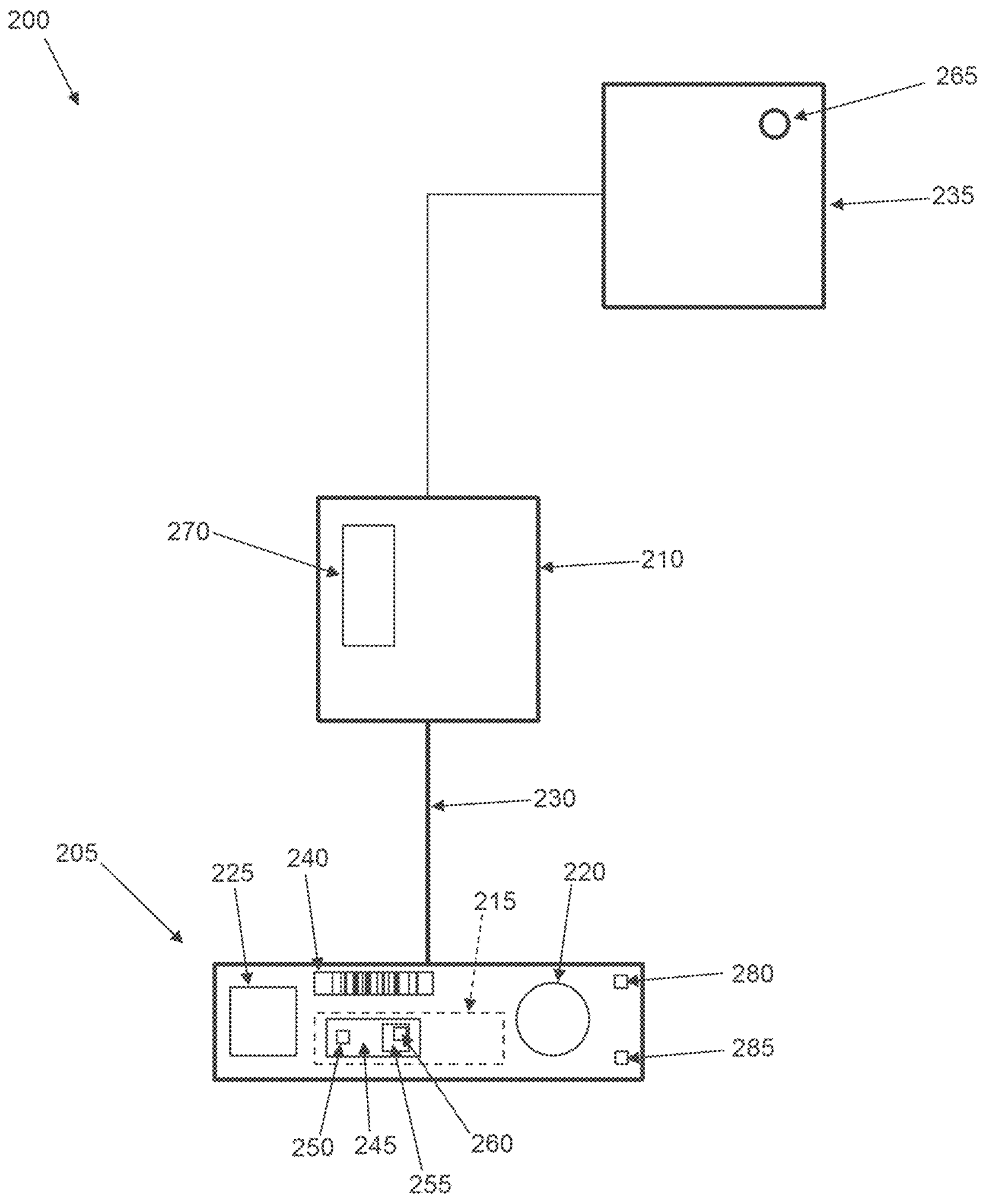
FIG. 5 is a schematic view showing another novel system for performing diffuse optical imaging (DOI) formed in accordance with the present invention.

Looking now at FIG. 5, the present invention addresses the foregoing issues by providing a new and improved optical imaging system 200. Optical imaging system 200 generally comprises a novel sensor module 205 (sometimes hereinafter referred to as a "smart patch") and an interface electronics module 210. Sensor module 205 comprises internal electronics 215, at least one optical source 220 for emitting light, and at least one detector 225 for detecting the light emitted by the at least one optical source 220 after the light has passed through tissue, as will hereinafter be discussed in further detail. A cable 230 links sensor module 205 (i.e., internal electronics 215, optical source 220, detector 225, etc.) to interface electronics module 210. In one preferred form of the invention, an external computer 235 may be connected to interface electronics module 210 in order to drive sensor module 205 and/or interface electronics module 210 and/or to store or process signals received from sensor module 205 and/or interface electronics module 210.

Sensor module 205 is configured to implement an improved calibration process by recording calibration information that is linked to that particular sensor module, as will hereinafter be discussed in further detail. The calibration information (i.e., calibration data) stored in a particular sensor module 205 can then be used to automatically adjust the system or the data processing, whereby to account for variations inherent in each particular sensor module. Sensor module 205 also requires fewer conductors (i.e., leads) because the circuitry added to the sensor module enables the same control as that enabled by prior art systems while requiring fewer conductors.

As discussed above, calibration of each individual sensor module 205 is necessary because each sensor module comprises components (e.g., laser diodes that make up the one or more optical sources 220, photodetectors that make up the one or more detectors 225, etc.) having some inherent degree of variability (e.g., variability in the materials or processes used to construct the components which affects the precision of those components), which variation, in turn, affects the accuracy of the resulting measurements. Specifically, semiconductor parts (e.g., laser diodes and/or photodetectors) tend to exhibit significant variation and are commonly tested after manufacture (and graded) according to performance. By way of example but not limitation, optical source 220 may comprise a laser diode (LD). Each laser diode (LD) may produce a different light output power given the same input current due to such variation inherent in the manufacture of laser diodes, and the output wavelength of the light produced by the laser diode will vary within the tolerance specified for the laser diode's grade. Similarly, where optical source 220 comprises a photodetector (PD), each particular photodetector (PD) may produce a different photocurrent in response to the same light input due to normal variation in their parameters when the photodetector is manufactured. By way of further example but not limitation, variations in the physical dimensions and locations of each component (e.g., optical source 220 and/or detector 225) may also result in varying measurements using those components, since the measured signal is a strong function of the distance from source (i.e., optical source 220) to detector (i.e., detector 225).

These variations must be accounted for (i.e., by calibration) when accurate absolute or relative parameters of the measured quantities are required, such as when performing diffuse optical imaging. The calibration process is generally done by operating the components or subsystems with known inputs (e.g., tissue phantoms, etc.) that are traceable to standard values as measured by organizations like the National Institute of Standards and Technology (NIST). The resulting measurements are then used to adjust the system so each system produces the same measurement as a standardized (i.e., fully-calibrated) testing station.

By way of example but not limitation, adjustments can involve modifying the system, i.e., by changing a resistor value (e.g., with a trimpot). Alternatively, adjustments can be done numerically, e.g., by multiplication of a result by a scale factor (i.e., a correction factor) that is tied to a particular subsystem or component if they exhibit a linear response. The process for automatically adjusting the hardware or software of novel optical imaging system 200 is detailed below.

In order to calibrate a sensor module 205 formed in accordance with the present invention to be used for diffuse optical imaging (DOI), the calibration measurements include the following aspects. The output of optical source 220 (e.g., one or more LDs) is a function of the drive signals from a laser diode driver and the characteristics of individual elements that make up optical source 220 (e.g., individual LDs). Such characteristics include the output power as a function of input current, as well as the wavelength of light produced by optical source 220 (e.g., the wavelength of light produced by the individual laser diodes that comprise optical source 220). Such characteristics also include how the current supplied to optical source 220 varies with component values such as resistors that set the driver current of elements (e.g., laser diodes) that make up optical source 220. The output of detector 225 (e.g., PDs) depends on the physical characteristics of each particular detector as well as the electronic characteristics of integrated circuits (ICs) and other components that form the detection circuitry of detector 225.

These characteristics can be measured with already-calibrated optical sources and detectors, and standard circuits having measured characteristics. By way of example but not limitation, calibration of the output power of optical source 220 typically involves using a driver circuit, wherein the drive current is known, and measuring the output of optical source 220 with a calibrated detector. Calibration of the wavelength of light emitted by optical source 220 generally involves measuring the wavelength of the output light using a spectrometer. The output of detector 225 is a function of the input light (i.e., the light emitted by optical source 220) and the characteristics of each particular detector 225, namely, the output photocurrent as a function of incident light power. Calibration of detector 225 generally involves using a fixed source having a known power and angular output, and measuring the output of detector 225 using a calibrated circuit and multimeter. Other factors such as the mechanical dimensions and locations of optical source 220 and/or detector 225, and angular output and input of optical source 220 and detector 225 also play a role in calibrating sensor module 205. These factors can be calibrated by attaching sensor module 205 to a tissue phantom having fixed, traceable optical absorption and scattering characteristics that are similar to human tissue, driving optical source 220 with a calibrated circuit and measuring the output of detector 225 with a calibrated circuit.

The present invention improves upon the foregoing calibration process by automating certain aspects of calibration. More particularly, the novel method of automatically calibrating sensor module 205 according to the present invention comprises using calibration information that is recorded and linked to each particular sensor module 205. One means of linking the information requires labeling each sensor module 205 with a unique identification label 240 (e.g., a label comprising a unique bar code, QR code, etc.) when the sensor module is manufactured. In a preferred form of the invention, calibration data is recorded and then stored in a database indexed by label 240. To this end, label 240 preferably comprises a unique identifier (e.g., a serial number) that is particular to the sensor module 205 to which label 240 is attached. When sensor module 205 is included in system 200, system 200 retrieves the calibration data using label 240, as will hereinafter be discussed in further detail.

The provision of a unique identification label 240 linking calibration data to a particular sensor module 205 is especially important in the circumstance in which a sensor module 205 fails and must be replaced by a clinician "in the field". That is, the standard calibration process discussed above with respect to prior art sensor modules requires special equipment (e.g., standards, tissue phantoms, etc.) having characteristics that are already calibrated. The standard calibration process used for prior art sensor modules is generally not feasible to do someplace other than at the factory where the sensor module is manufactured, since a traceable set of such calibration equipment is complicated to setup and usually requires operation by skilled personnel.

Label 240 can be a physical label (e.g., a barcode, QR code, etc.) that is attached to sensor module 205, or label 240 can be printed directly on the housing of sensor module 205.

Alternatively and/or additionally digital values (i.e., the calibration data) may be stored in memory contained within the sensor module 205. More particularly, if desired, internal electronics 215 of sensor module 205 may comprise an integrated circuit (IC) 245 comprising memory 250 for storing calibration data. By way of example but not limitation, integrated circuit 245 may comprise an inexpensive IC having a small physical footprint, and memory 250 may comprise non-volatile memory (e.g., EEPROM).

In addition, if desired, internal electronics 215 of sensor module 205 may comprise a microcontroller unit (MCU) 255 comprising non-volatile memory 260 for storing programs and/or data (e.g., calibration data, digitized data received by detector 225, etc.).

As noted above, if desired, the calibration data for a particular sensor module 205 can be stored in label 240 attached to (or printed) on the sensor module 205. Label 240 is typically a 2D barcode which can be read automatically in order to store more information than is possible with a 1D barcode. Alternatively, if desired, calibration data may be stored in a database (e.g., a database external to the optical imaging system 200, such as a database connected to optical imaging system 200 via the Internet) that is indexed by a unique identifier (e.g., a unique identifier that may be printed on label 240 or encoded in the barcode printed on label 240). The database where the foregoing calibration data are stored can be implemented on a server accessible to optical imaging system 200 via the Internet (or an equivalent network). Alternatively, if desired, the database containing the foregoing calibration data can be stored in a file on computer 235 (i.e., an external computer configured to run optical imaging system 200, and an appropriate user interface to achieve that purpose), though such a configuration may require periodically updating the database file with information for replacement parts (e.g., when a sensor module 205 is replaced with a new sensor module 205 comprising new calibration data particular to the new sensor module 205).

If desired, calibration data for a particular sensor module 205, or a database containing such calibration data, may be stored in non-volatile memory located on sensor module 205 (e.g., memory 240 contained within IC 245 and/or memory 260 contained within MCU 255). With this form of the invention, interface electronics module 210 is preferably configured to query sensor module 205 for calibration data stored in memory 240 and/or memory 260 and use the calibration data to directly adjust the system electronics, or interface electronics module 210 can be configured to forward the calibration data to computer 235 so that the calibration data can be linked to each measurement made using optical imaging system 200 (e.g., in order to be used computationally via application of a correction factor, etc.).

It should be appreciated that, where the calibration data relates to a particular sensor module 205, and where that calibration data is physically stored on that sensor module 205 (e.g., by incorporating the calibration data into label 240 comprising an optically-readable code, or by incorporating the calibration data into electronic memory 250 and/or 260 so that the calibration data may be read from the electronic memory, etc.), it is not necessary to associate a unique identifier with that particular sensor module, and it is not necessary to associate a unique identifier with the calibration data stored on that particular sensor module, since the calibration data will necessarily relate to that particular sensor module only.

In use, optical imaging system 200 is configured to automatically utilize calibration data associated with, or stored on, a particular sensor module 205. By way of example but not limitation, in a preferred form of the invention, optical imaging system 200 is configured such that, when optical imaging system 200 is powered ON (e.g., when interface electronics module 210, sensor modules 205, etc. are supplied with electrical power), interface electronics module 210 and/or computer 235 (when computer 235 is provided for controlling optical imaging system 200), retrieves the calibration data associated with the particular sensor module(s) 205 that are connected to interface electronics module 210. By way of example but not limitation, interface electronics module 210 can be configured to read the identity and calibration data for a particular sensor module 205 over a serial interface such as $I^2C$ or SPI from memory 250 (e.g., an EEPROM) contained within IC 245 located on that sensor module 205.

By way of further example but not limitation, in another form of the invention, computer 235 comprises a camera or barcode reader 265 which may be used to scan label 240 disposed on a particular sensor module 205 to retrieve the unique identity for that particular sensor module 205, whereby to use that unique identity to query a database (e.g., a database stored on a server connected to computer 235 via the Internet) in order to retrieve the calibration data for that particular sensor module 205. If desired, the unique identity information identifying the particular sensor module 205 used to obtain a measurement and/or the calibration data for that particular sensor module 205 may be recorded together with the measurement, thereby establishing traceability of the measurement. It should be appreciated that, while computer 235 may be connected to interface electronics module 210 via a physical cable, computer 235 may, alternatively, be wirelessly connected to interface electronics module 210 (e.g., via Bluetooth, Wi-Fi, etc.). It should also be appreciated that, if desired, computer 235 may be a smartphone, tablet, laptop or other portable electronic device.

The calibration data is then used by optical imaging system 200 to adjust a component of optical imaging system 200 (e.g., to adjust sensor module 205) or to adjust (e.g., via application of a correction factor, use of a look-up table, etc.) the numerical computations performed when processing the measured data. In order to keep the process as efficient and error free as possible, it is desirable that every step be done automatically without human intervention. By way of example but not limitation, calibration data relating to a particular detector 225 of a particular sensor module 205 may be used to adjust the circuitry of that particular sensor module 205 and/or the circuitry of interface electronics module 210. Alternatively and/or additionally, and by way of further example but not limitation, if desired, calibration data relating to the particular detector of a particular sensor module 205 may be used to adjust the computation performed (e.g., via application of a correction factor, by use of a look-up table linked to the calibration data, etc.) in order to process the data measured by a particular detector 225 of a particular sensor module 205.

Adjustment of optical imaging system 200 is also preferably done automatically (i.e., without human intervention). In embodiments of the present invention in which optical imaging system 200 adjusts an electronic component (e.g., a sensor module 205), interface electronics module 210 uses the calibration data to perform the adjustment electronically under software control. By way of example but not limitation, the system of the Hielscher '312 patent includes a programmable gain amplifier, wherein the gain is controlled by an microcontroller unit (MCU), to adjust the sensitivity of the detection circuitry. The calibration data for the associated detector 15 can be used by the system to automatically set the programmable gain.

By way of further example but not limitation, manual trimpots may be used with the system of the Hielscher '312 patent to set the output levels of NIR sources 10. If desired, with the present invention, the manual trimpots of the Hielscher '312 patent may be replaced with digital trimpots controlled by $I^2C$ or SPI interfaces. The calibration data can include the required digital values to produce the proper output of NIR sources 10, which can then be automatically set.

It should be appreciated that, although novel optical imaging system 200 is depicted as comprising a single sensor module 205, if desired, optical imaging system 200 may comprise a plurality of sensor modules (i.e., in the manner of optical imaging system 105 shown in FIG. 4) without departing from the scope of the present invention.

Note that with the present invention, and looking now at FIG. 6, the control flow is typically as follows. Computer 235 directs interface electronics module 210 to query sensor module 205, whereby to enable retrieval of the relevant calibration data (see above). Using that calibration data, interface electronics module 210 adjusts its circuitry accordingly, e.g., to set the detection circuitry for detector 225. Interface electronics module 210 may also direct sensor module 205 to adjust its circuitry, e.g., to set the laser driver circuitry to control the output of optical source 220.

Figure 6:
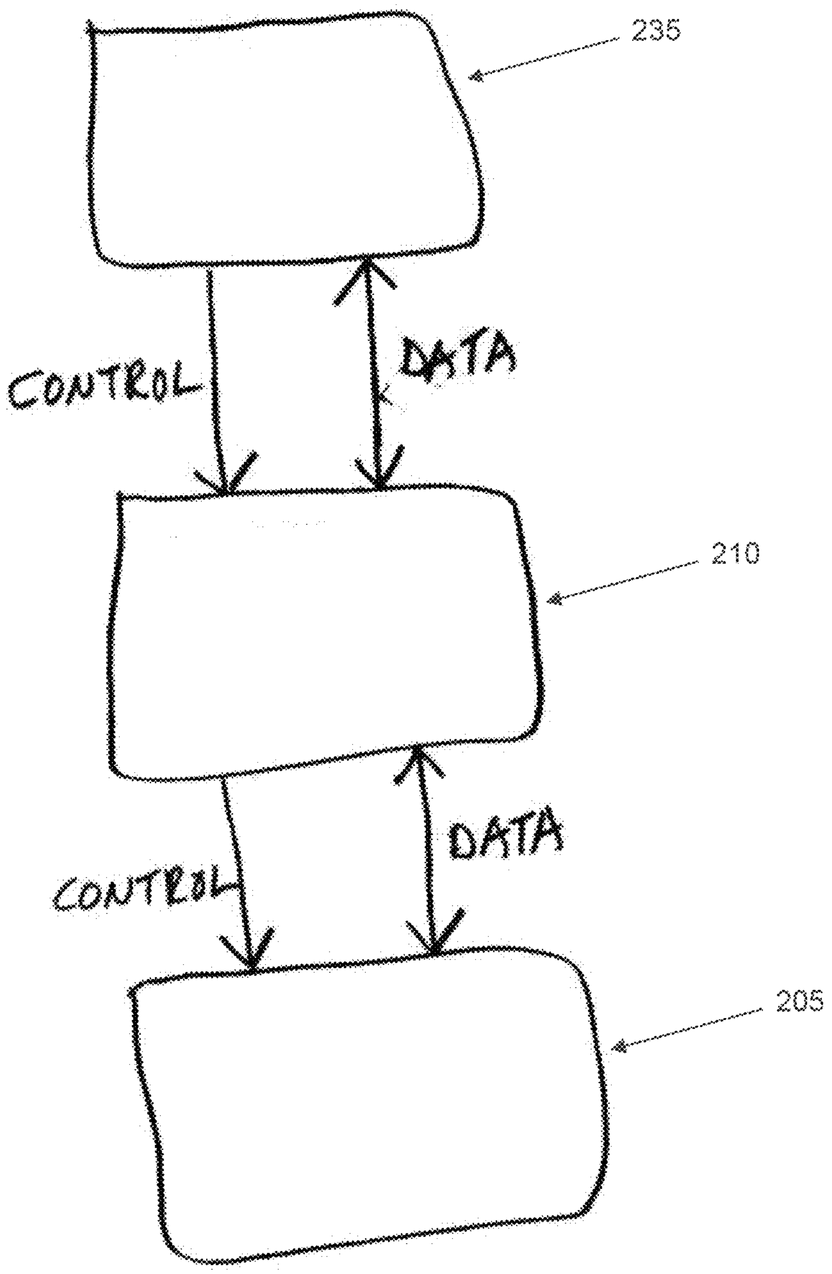
FIG. 6 is a schematic view showing communication between the computer, the interface electronics module, and the sensor module of the novel system of FIG. 5.

In order to implement the approach depicted schematically in FIG. 6, interface electronics module 210 must be capable of communicating with sensor module 205. This can be implemented in a variety of ways. In a preferred form of the invention, interface electronics module 210 comprises a microcontroller unit (MCU) 270 (FIG. 5). MCU 270 is configured to communicate with circuitry on sensor module 205. Such communication can be performed using older communication protocols like RS-232 or RS-485, or with more modern protocols such as USB, $I^2C$/Two-Wire Interface or SPI. Depending on the required data rate, cable length, and capacitance, a transceiver or bus extender (not shown) may be required for reliable serial communication. For example, the $I^2C$ interface normally sets a maximum of 400 pF for the buses. The P82B715 $I^2C$ Bus Extender IC allows transmission lines with up to 3000 pF, thus permitting the $I^2C$ interface to extend between PCBs (i.e., between MCU 270 and the internal electronics 215 of sensor module 205) separated by a cable several meters in length.

As discussed above, reducing the conductor count in cable 230 is desirable in order to reduce the cost of cable 230, as well as to allow for cable 230 to be lighter and more flexible. It will be appreciated that the number of conductors contained within cable 230 can be reduced if some functionality is moved from interface electronics module 210 to sensor module 205. By way of example but not limitation, a sensor module 205 comprising multiple optical sources 210 (e.g., multiple LDs) may require 2 or 3 conductors per component (i.e., to connect the optical sources 210 to a driver located on interface electronics module 210). However, in one preferred form of the present invention, sensor module 205 comprises a driver 275 (e.g., laser diode driver 275 shown in FIG. 7) configured to drive optical sources 210 contained on that particular sensor module 205, thereby eliminating the need for conductors between a driver located on interface electronics module 210 and the sensor module. It will be appreciated that this approach reduces the overall number of conductors contained in cable 230 (and hence the size/weight of cable 230).

In general, "smart" functionality generally requires at least four conductors: power, ground, and two for communication. Those four conductors can control multiple integrated circuits (ICs) if the control signals can be used by multiple devices. In order to control multiple ICs, an $I^2C$ switch like the PCA9546 may be used. Protocols such as $I^2C$ may permit multiple ICs with different addresses to be connected to a daisy-chained bus. In cases where address conflicts arise, or the added capacitive loading of multiple devices is problematic, a switch like the PCA9546 may be utilized in order to simplify the design or require fewer conductors between the interface electronics module 210 and sensor module 205.

Figure 7:
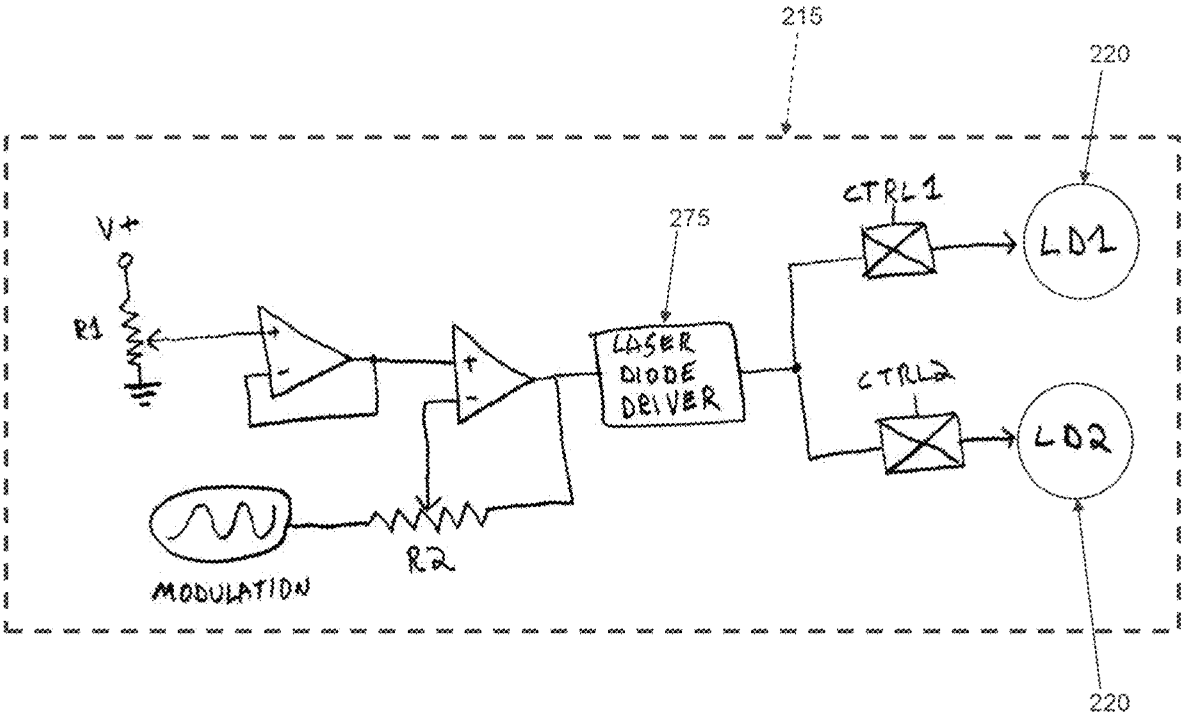
FIG. 7 is a schematic view showing a novel circuit formed in accordance with the present invention, the novel circuit comprising the modulation signal and 2 op-amps and being configured to adjust the modulation signal for the NIR source and to switch the driver between two NIR sources (i.e., LD1 and LD2)

In a preferred form of the invention, sensor module 205 comprises multiple optical sources 220 (e.g., LDs) with much of the electronic control of optical sources 220 contained on that sensor module 205. Looking now at FIG. 7, this can be accomplished by illuminating one optical source 220 (i.e., one LD) at a time, and sharing a single driver (i.e., laser diode driver 275) whose output is switched between the two (or more) optical sources 220. In a preferred form of the invention, the output of optical sources 220 is modulated to enable lock-in detection at a frequency greater than the AC line frequency (i.e., the frequency of the mains electrical power supplied as alternating current, or "AC") which is 60 Hz in North America and 50 Hz in most of the rest of the world. The modulation frequency must be higher in order to cancel out the contribution from room light which can have a component at the AC line frequency. The present invention provides adjustable circuitry to set the power level of optical sources 220 as well as the amount of modulation applied to the output of optical sources 220. That circuit, shown schematically in FIG. 7, shows the bias and gain of the modulation signal adjusted by resistors R1 and R2. The output of optical sources 220 is switched between the two optical sources (i.e., LDs) using control signals CTRL1 and CTRL2, as will be apparent to one of ordinary skill in the art in view of the present disclosure.

Still looking at FIG. 7, the components of the exemplary circuit can be controlled as follows. A pair of digitally programmable variable resistors on an integrated circuit (IC) (e.g., $I^2C$ programmable MCP4641) can be used for resistors R1 and R2. A switch (e.g., FSA6157) can be controlled, with an $I^2C$ programmable GPIO expander FXL6408 providing the CTRL1 and CTRL2 signals.

Figure 1:
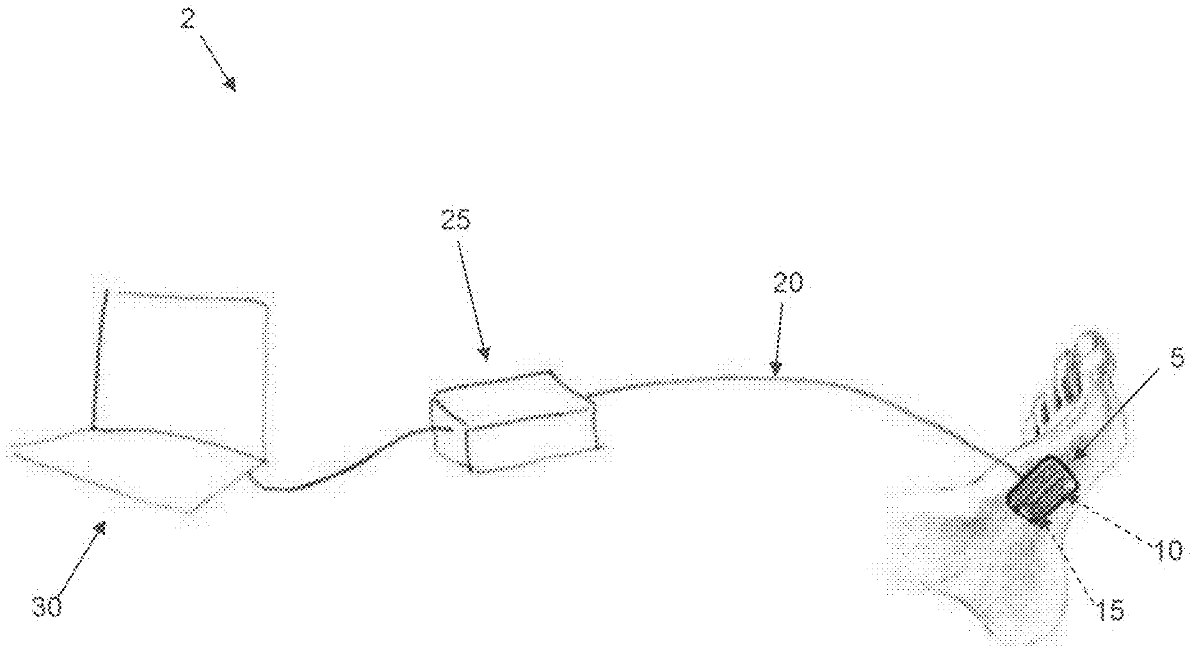
FIG. 1 is a schematic view showing a prior art diagnostic system comprising a computer, an interface electronics module, a multi-conductor cable, and a sensor module secured to a foot of a patient.
Figure 2:
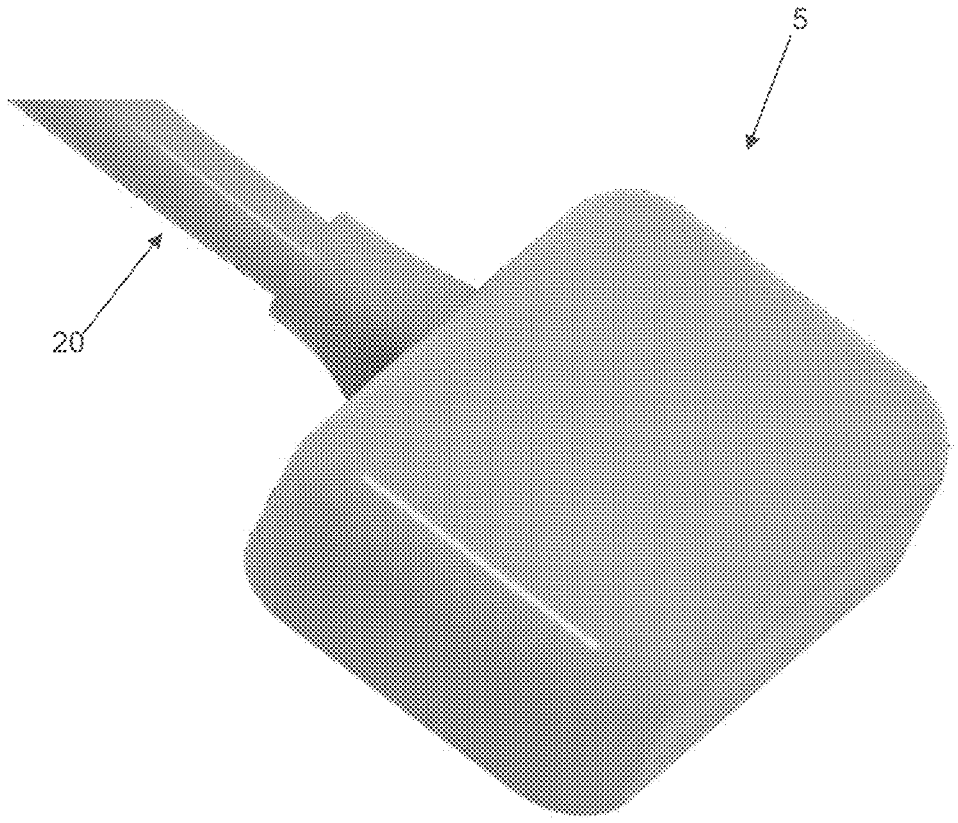
FIGS. 2 and 3 are schematic views showing a sensor module according to the system of FIG. 1, including a top perspective view (FIG. 2) and a bottom view (FIG. 3) showing exemplary NIR sources (i.e., LDs) and detectors (i.e., PDs)
Figure 3:
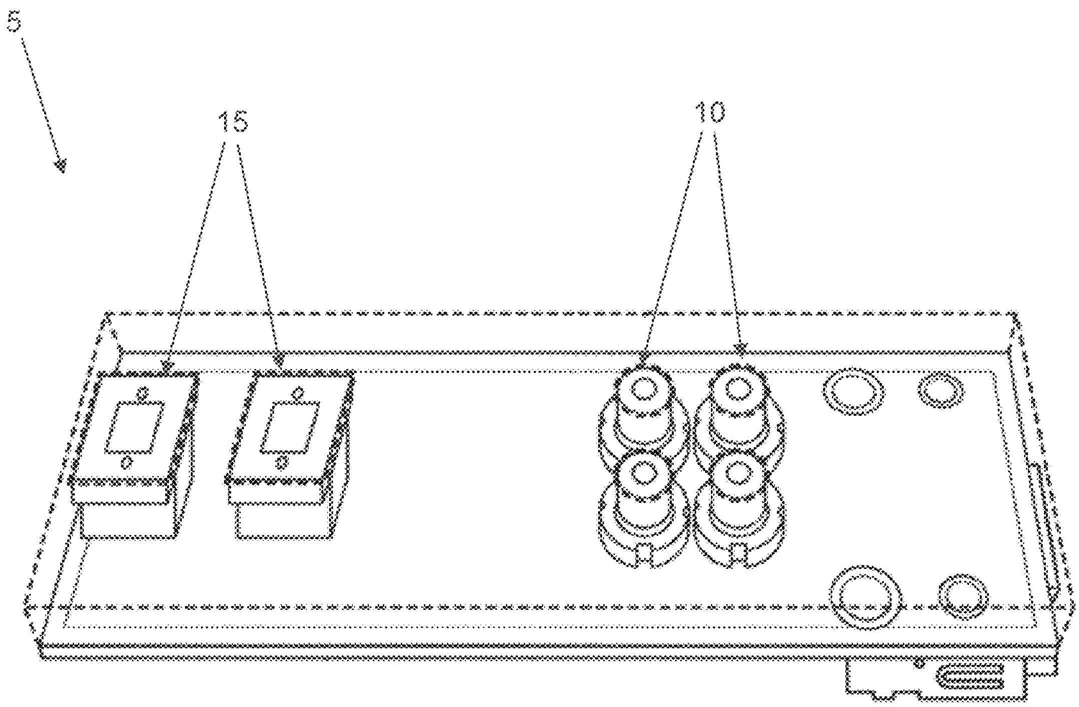

To visualize the effect of the novel circuitry of the present invention, consider that the prior art sensor module 5 shown in FIG. 2 comprises 4 NIR sources (LDs) and 2 detectors (PDs). With the laser driver functionality moved to the internal circuitry of sensor module 5 according to the present invention, 12 conductors between sensor module 5 and interface electronics module 25 are eliminated, being replaced by only four conductors (i.e., two conductors for power and ground and two conductors for communication). In addition, it should be appreciated that one additional conductor may be required for the modulation signal, thereby reducing the required conductor count for controlling NIR sources 10 from 12 conductors to 4 (or 5) conductors. Other conductors are still required for transmitting the detected signals from detectors 15 to interface electronics module 25, unless the detection functionality and digital sampling is also contained within the internal circuitry of the sensor module.

Another approach to reducing the number of conductors between interface electronics module 210 and sensor module 205 according to the present invention comprises using a single conductor to perform multiple functions. By way of example but not limitation, the modulation signal is typically a voltage signal, and the signal may be sinusoidal for single frequency amplitude modulation. Such a signal may be combined with AC coupling through a capacitor onto the power to sensor module 205 which power is typically a DC voltage, e.g., 5V. On sensor module 205, that power conductor is preferably AC coupled to an amplifier in order to recover the modulation signal, and is DC coupled with low-pass filtering to the power supply circuit.

In the systems described in the Hielscher '312 patent and the Hielscher '594 patent, the laser (i.e., the optical source) is sinusoidally modulated at a particular frequency, e.g., 5 kHz. The detector signal is digitized at a multiple of that frequency (i.e., the frequency at which the optical source is modulated), e.g., 50 kHz. The detected time series is then digitally demodulated by multiplying by sampled sine and cosine functions at the 5 kHz modulation frequency and summing the result. The sine and cosine sums are added in quadrature to yield the signal level. This is a form of lock-in detection that greatly reduces the contribution of noise. A constant background multiplied by a sine or cosine will sum to zero, and white noise will have its rms contribution reduced by $1/\sqrt{N}$ where N is the number of samples summed. The noise performance can be increased if the relative phase of the sampled series and the modulation signal are known.

In the example discussed above, the modulation signal is transmitted from interface electronics module 210 to sensor module 205. The modulation signal is used by driver 275 to modulate the output of optical source(s) 220, as is shown schematically in FIG. 4. In another form of the invention, sensor module 205 comprises an MCU (e.g., the aforementioned MCU 255) which is used to generate the modulation signal and control the variable resistors (e.g., R1 and R2) and switches (e.g., CTRL1 and CTRL2) needed to control the output of optical source(s) 220.

With the reduced number of conductors resulting from the embodiment of the present invention described above, where sensor module 205 comprises four optical sources 220 (e.g., four LDs) and two detectors 225 (e.g., two PDs), four conductors are required for power and control of optical sources 220, as well as two shielded conductors for the signals output by detectors 225. This number of conductors fits within the USB 3.0 standard, and the standards discussed above which have power, ground, a differential (twisted) pair for USB 2.0 data, and two differential (twisted) pairs to transmit and receive USB 3.0 data. The power, ground, and USB 2.0 twisted pair can be used for power, ground, and communication between interface electronics module 210 and sensor module 205, while the two twisted pairs for USB 3.0 data can serve for the signals from detectors 225. Thus, a sensor module 205 formed in accordance with the present invention can utilize "off-the-shelf" cables and connectors, whereby to be less expensive and easier to obtain than custom cables and connectors.

If desired, additional electronic components may be added to the internal electronics 215 of sensor module 205 to increase functionality. By way of example but not limitation, sensor module 205 may include several visible indicators (e.g., LEDs) which are controlled by the MCU 255 of sensor module 205. When optical imaging system 200 is set up for use, sensor modules 205 are secured to the patient (e.g., such that optical sources 220 and detectors 225 are disposed against the skin of the patient) and internal electronics 215 of each sensor module 205 go through an initialization to verify that each sensor module 205 is working properly. The visual indicator (e.g., LEDs) can then blink in order to identify a sensor module so that the clinician can confirm that that sensor module 205 is secured in the right place on the patient's anatomy. The interface can also illuminate a visual indicator (e.g., an LED) after the sensor module has successfully completed initialization.

Furthermore, if desired, functionality may be added to sensor module 205 in order to increase the safety of optical imaging system 200. By way of example but not limitation, although the power of the NIR sources 10 utilized in prior art systems such as that of the Hielscher '312 patent is relatively low and does not pose a safety/regulatory issue, prudence dictates that possible laser exposure (where NIR sources 10 comprise LDs) should be minimized. This can be accomplished in two ways according to the present invention.

First, a visual indicator (e.g., an LED) controlled by MCU 255 can be illuminated to show that optical source(s) 220 (e.g., LDs) are turned on and emitting light (e.g., laser radiation).

Second, sensor module 205 may comprise a sensor 280 (FIG. 5) for indicating when the sensor module has been secured on a patient (e.g., so as to be in proper contact with the skin of the patient). By way of example but not limitation, sensor 280 may comprise a reflective optical sensor with a near infrared light emitting diode (NIR LED) and an associated detector (PD) facing in the same direction, whereby to serve as a proximity sensor. Detection of light emitted by the LED (i.e., by the associated detector) indicates that a reflecting material, e.g., human skin, is in close proximity to sensor 280. By communicating with MCU 255 of sensor module 205, the system software (e.g., software contained within and running on MCU 255) can be configured to check that sensor module 205 is attached to the patient, using the output of sensor 280 as an "interlock" that prevents illuminating optical source 220 when sensor module 205 is not secured to the patient. Other safety sensors such as microswitches or magnetic switches can be used for this purpose as well, as will be apparent to one of skill in the art in view of the present disclosure.

In addition to the foregoing, if desired, other functionality can be added to sensor module 205 in order to increase its diagnostic capability. While light sources (i.e., optical source 220) and detectors (i.e., detector 225) provide the data for performing diffuse optical imaging (DOI), other sensors can be added to sensor module 205 in order to provide additional data. By way of example but not limitation, if desired, a temperature sensor 285 (e.g., a MLX90632 FIR sensor) may be incorporated in sensor module 205 for obtaining the local body temperature (i.e., at the location of sensor 285) of the patient when sensor module 205 is secured to the patient. It is well-known that circulatory diseases such as PAD can manifest in patients having compromised circulation exhibiting lower local temperatures (e.g., at their peripheral limbs such as the legs and arms) than the patient's core body temperature. Combining local temperature measurements obtained with temperature sensor 285 with diffuse optical imaging (DOI) measurements can potentially provide additional useful diagnostic information.

In another form of the present invention, if desired, the need for either the power connection or communication lines (i.e., conductors) between interface electronics module 210 and sensor module 205 may be eliminated. With this form of the invention, sensor module 205 comprises a battery (or other power source). Communication of the unique identification number associated with a particular sensor module 205 and/or calibration data associated with a particular sensor module 205 is achieved via a wireless connection (and an associated transceiver carried by sensor module 205) between sensor module 205 and an appropriately configured interface electronics module 210. Alternatively, if desired, with this form of the invention, interface electronics module 210 may be omitted, and sensor module 205 may wirelessly communicate with external computer 235 (which computer provides the functionality of interface electronics module 210 for communicating control signals to the sensor module 205 and receiving the measurement data communicated by sensor module 205). By way of example but not limitation, such a wireless connection may be provided via Bluetooth, RFID (i.e., near field communication), or Wi-Fi.

Furthermore, if desired, in still another form of the present invention, all the analog components are omitted from interface electronics module 210, such that only digital signals are transmitted between sensor module 205 and interface electronics module 210 or between sensor module 205 and computer 235. To this end, sensor module 205 may comprise amplifiers and digitizers (e.g., an analog-to-digital converter, or "ADC") which are configured to convert signals from detector 225 to digital numbers (e.g., digital numbers corresponding to the light detected by detector 225). As discussed above, if desired, the digital signals transmitted between sensor module 205 and interface electronics module 210 (or, where interface electronics module 210 is omitted, between sensor module 205 and external computer 235) may be wirelessly transmitted.

Figure 8:
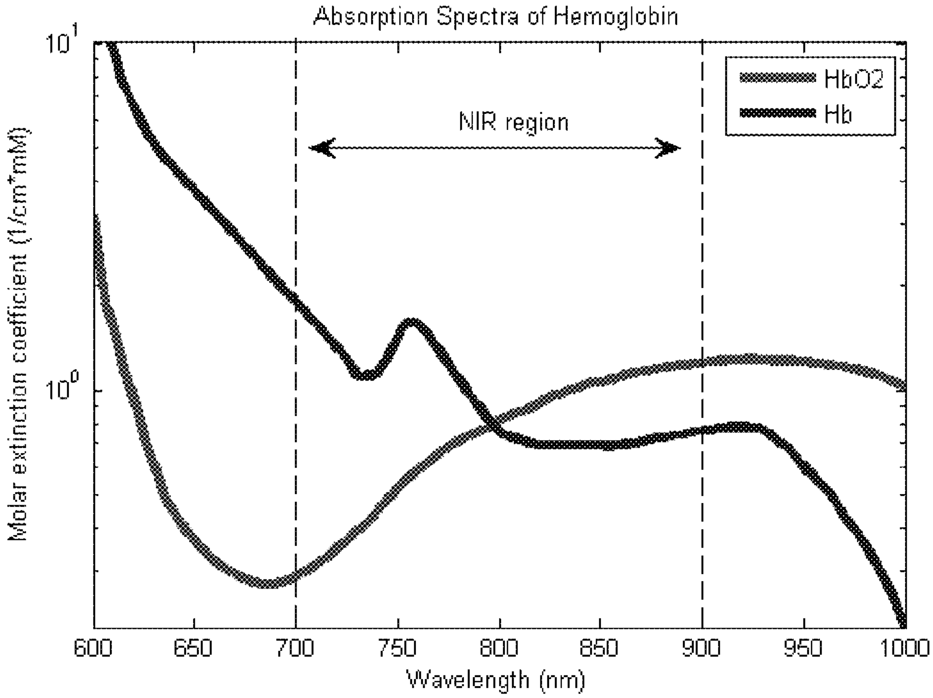
FIG. 8 is a graph showing the NIR absorption spectrum of oxygenated $HbO_2$ and unoxygenated Hb as a function of wavelength.

As discussed above, in addition to adjusting the system electronics, calibration data can be incorporated into the analysis of the measurements (e.g., via application of a correction factor to the computation used to arrive as the measurement result, via use of a look-up table used to arrive at the measurement result, etc.). By way of example but not limitation, and looking now at FIG. 8, there is shown a chart showing NIR variation of absorption of Hb and $HbO_2$ as a function of the wavelength of light absorbed. Wavelengths of common grades of LDs used in optical source 220 vary by an amount, #10 nm, that produces significant variation in absorption, as can be appreciated from the chart shown in FIG. 8. Thus, accurate estimation of Hb and $HbO_2$ concentration can require knowledge of the actual wavelength of light emitted by a particular LD used in optical source 220 to perform a measurement. The wavelength of light emitted by an LD can be measured using standard illumination conditions and stored with the calibration data, thus enabling more accurate analysis than if the nominal wavelength were used.

Other calibration measurements may also be useful for analysis. By way of example but not limitation, the optical coupling efficiency between a particular LD used as optical source 220 to a particular PD used as detector 225 can be calibrated using a phantom having known optical properties. This coupling efficiency will vary depending on several factors that are particular to individual LDs, PDs, and sensor modules. These factors include the angular output of each LD, the sensitivity of each PD, and the as-assembled 3D geometry of each sensor module 205. This overall optical coupling efficiency may be useful in reducing the variables in a particular calculation that estimates the concentration of various tissue components.

With the improvements over the prior art provided by the present invention, the sensor module 205 becomes a "plug-and-play" component in optical imaging system 200. When provided, the system can automatically retrieve the calibration data for particular sensor module(s) 205 that are to be used in a particular configuration of optical imaging system 200, and can adjust the circuitry accordingly. Similarly, calibration values such as the LD wavelength and optical coupling efficiencies can be used in calculations analyzing the measurement data obtained using optical imaging system 200. Sensor module(s) 205 can be replaced in the field by unskilled clinicians in the event of a failure, and the system can be automatically adjusted in order to produce calibrated measurements.

MODIFICATIONS

Although various exemplary embodiments of the invention have been disclosed, it should be apparent to those skilled in the art that various changes and modifications can be made to the disclosed embodiments without departing from the scope of the invention.

What is claimed is:

1. An apparatus for performing diffuse optical imaging of a patient, said apparatus comprising:

a computer;

at least one sensor module comprising at least one optical source, at least one photodetector, and memory comprising calibration data specific to said at least one sensor module, wherein the calibration data comprises at least one from the group consisting of (i) a measured output power for the at least one optical source in response to adjustments of the apparatus, (ii) a measured signal, gain, or sensitivity of the at least one photodetector in response to a calibrated source of optical power, and (iii) a measured wavelength of light produced by the at least one optical source;

an interface electronics module for communicating between said computer and said at least one sensor module;

wherein the apparatus is configured to be automatically adjusted based on the calibration data in order to produce calibrated diffuse optical imaging measurements of the patient.

2. The apparatus of claim 1 wherein said at least one sensor module comprises non-volatile memory.

3. The apparatus of claim 1 wherein said at least one sensor module comprises a unique identifier.

4. The apparatus of claim 3 wherein said calibration data is stored in an external database.

5. The apparatus of claim 4 wherein said database is stored on a server accessible on a network.

6. The apparatus of claim 4 wherein the database is stored in the memory on said at least one sensor module.

7. The apparatus of claim 4 wherein the database is stored on said computer.

8. The apparatus of claim 3 wherein said unique identifier comprises an optically readable code.

9. The apparatus of claim 3 wherein said unique identifier is stored in the memory on said at least one sensor module.

10. The apparatus of claim 1 wherein said at least one sensor module further comprises electronic components configured to control the output of said at least one optical source.

11. The apparatus of claim 1 wherein said at least one sensor module further comprises electronic components configured to modulate the output of said at least one optical source at a frequency greater than the AC line frequency.

12. The apparatus of claim 1 wherein said at least one sensor module further comprises electronic components selected from the group consisting of a visible indicator, a proximity sensor, a temperature sensor, a microcontroller unit (MCU), a bus extender, a digital trimpot, an electronic switch, an analog-to-digital converter (ADC), an amplifier, and a driver circuit for said at least one optical source.

13. The apparatus of claim 1 wherein said at least one sensor module further comprises an electronic sensor configured as a safety interlock to prevent illuminating said at least one optical source when said at least one sensor module is not attached to the patient.

14. The apparatus of claim 1 further comprising a multi-conductor cable connecting said at least one sensor module to said computer.

15. The apparatus of claim 14 wherein a single conductor of said multi-conductor cable is configured to provide at least one selected from the group consisting of (i) providing electrical power to said at least one sensor module; (ii) communicating digital control signals between said computer and said at least one sensor module; and (iii) communicating analog signals between said computer and said at least one sensor module.

16. The apparatus of claim 1 wherein said sensor module is wirelessly connected to said computer.

17. A method for calibrating apparatus used in performing diffuse optical imaging of a patient, said method comprising:

providing apparatus comprising:

a computer; and a sensor module comprising:

at least one light source;

at least one light detector; and memory comprising calibration data specific to said sensor module, wherein the calibration data comprises at least one from the group consisting of (i) a measured output power for the at least one optical source in response to adjustments of the apparatus, (ii) a measured signal, gain, or sensitivity of the at least one photodetector in response to a calibrated source of optical power, and (iii) a measured wavelength of light produced by the at least one optical source;

accessing said calibration data from said sensor module; and using said calibration data to calibrate said apparatus prior to performing diffuse optical imaging of the patient.

18. The method of claim 17 wherein performing diffuse optical imaging of the patient comprises securing said calibrated sensor module to the patient such that said at least one light source and said at least one detector are positioned against the skin of the patient;

actuating said at least one light source and said at least one detector; and measuring light absorbed by the tissue of the patient using said at least one detector and obtaining measurement data corresponding to the light absorbed by the tissue of the patient.

19. The method of claim 18 wherein said calibration data is used to computationally calibrate said measurement data.

20. The method of claim 17 wherein said sensor module is wirelessly connected to said computer.

21. Apparatus for performing diffuse optical imaging of a patient, said apparatus comprising:

a sensor module comprising:

at least one light source;

at least one light detector; and a unique label disposed on an exterior surface of said sensor module, wherein said unique label comprises calibration data corresponding to said sensor module, wherein the calibration data comprises at least one from the group consisting of (i) a measured output power for the at least one optical source in response to adjustments of the apparatus, (ii) a measured signal, gain, or sensitivity of the at least one photodetector in response to a calibrated source of optical power, and (iii) a measured wavelength of light produced by the at least one optical source;

wherein the apparatus is configured to be automatically adjusted based on the calibration data in order to produce calibrated diffuse optical imaging measurements of the patient.

22. The apparatus of claim 21 wherein said unique label comprises an optically-readable code.

23. The apparatus of claim 21 wherein said calibration data is stored in memory on said sensor module.

24. The apparatus of claim 21 further comprising:

a database comprising calibration data for said sensor module, wherein said calibration data for said sensor module is associated with said unique identifier for that sensor module.

25. The apparatus of claim 24 wherein said database is stored on a server accessible on a network.

26. The apparatus of claim 24 wherein said database is stored in memory on each of said plurality of sensor modules.

27. The apparatus of claim 1 wherein the calibration data comprises gain of electronic circuitry which processes signals relayed from the at least one photodetector.

28. The method of claim 17 wherein calibrating said apparatus comprises electronically adjusting the output power for the at least one optical source to a known standard value, passing light from the at least one light source through a standard of known absorption, and measuring light detected by the at least one light detector after the light is passed through the standard of known absorption.

29. The method of claim 17 wherein the calibration data comprises gain of electronic circuitry which processes signals relayed from the at one light detector.

* * * * *